United States Patent [19]
Koch et al.

[11] Patent Number: 5,630,749
[45] Date of Patent: May 20, 1997

[54] APPARATUS FOR THE MECHANICAL REMOVAL OF DEPOSITS ON WELDING ELECTRODES

[76] Inventors: Walter Koch, Apolloweg 5, D 44287 Dortmund; Kai Meermann, Finefrauweg 15, D 58456 Witten, both of Germany

[21] Appl. No.: 520,776

[22] Filed: Aug. 30, 1995

[30] Foreign Application Priority Data

Sep. 1, 1994 [DE] Germany .................. 9414151 U

[51] Int. Cl.$^6$ .................. B24B 9/02; B24B 41/00
[52] U.S. Cl. .......... 451/180; 451/340; 451/361; 451/363; 451/49
[58] Field of Search .................. 451/180, 361, 451/363, 5, 49, 67, 340; 409/143

[56] References Cited

U.S. PATENT DOCUMENTS

| | | | |
|---|---|---|---|
| 4,537,177 | 8/1985 | Steere, Jr. et al. | 451/180 X |
| 4,668,136 | 5/1987 | Santa | 451/180 X |
| 4,858,388 | 8/1989 | Bice | 451/180 X |
| 5,056,265 | 10/1991 | Hurst | 451/180 X |
| 5,067,860 | 11/1991 | Kobayashi et al. | 451/180 X |
| 5,221,826 | 6/1993 | Lee et al. | |

FOREIGN PATENT DOCUMENTS

| | | |
|---|---|---|
| 0171113 | 2/1986 | European Pat. Off. . |
| 0581308A1 | 2/1994 | European Pat. Off. . |
| 3740230A1 | 6/1988 | Germany . |
| 3816912C2 | 4/1990 | Germany . |
| 3932089A1 | 5/1990 | Germany . |
| 62-81279 | 4/1987 | Japan . |
| 546792 | 7/1942 | United Kingdom . |

*Primary Examiner*—Timothy V. Eley
*Attorney, Agent, or Firm*—Banner & Witcoff, Ltd.

[57] ABSTRACT

The invention relates to an apparatus for the mechanical removal of deposits on welding electrodes. Welding electrodes have to be cleaned after a certain number of welding operations due to deposits. Therefore an apparatus is provided which is essentially subdivided into two subassemblies, namely a machining head and a holding device in the form of a stand or pedestal, which can be installed universally and in any position. The apparatus is characterized by a simple construction of a pneumatic motor which is an integral part of the apparatus. The pneumatic motor rotor is housed in a rotary manner in the machining head, which also contains the gear and the holder for the abrading tool to clean the welding electrodes.

11 Claims, 4 Drawing Sheets

APPARATUS FOR THE MECHANICAL REMOVAL OF DEPOSITS ON WELDING ELECTRODES

The invention relates to an apparatus for the mechanical removal of deposits on welding electrodes having a holder for an abrading tool for abrading the deposits on the welding electrode and a pneumatic drive, which has a rotor, with a gear for driving the holder in rotational movement.

Welding electrodes, particularly for industrial robots, have to be replaced after a certain number of welding operations due to deposits (welding grit).

The welding electrodes have copper electrode caps, which are mounted on support bodies. In the case of wear they are removed by means of a special tool from the actual welding electrode and replaced by new ones.

An apparatus is already known, which abrades by means of a rotary stripping or flaking off device the welding grit occurring during the welding process. The actual apparatus comprises a reception device and a pneumatic motor flanged to the latter used for driving a stripping or flaking off device located in the reception device. The stripping device comprises a disk, which is equipped with cutting tools. The reception device is uncoupled from the motor by means of resilient spacing elements. The reception device and the motor are firmly connected to a supporting unit, which is in turn resiliently alternately mounted in a U-shaped profile.

For cleaning the welding electrodes or electrode caps the industrial robot with the ends of the welding electrodes passes into the rotating stripping device of the reception device, imprecise positioning of the robot arm being compensated by the resilient mounting of the overall apparatus. However, this apparatus suffers from high manufacturing costs and its power is insufficient for particularly hard electrodes.

Therefore the problem of the invention is to so further develop an apparatus for the mechanical removal of deposits on welding electrodes, that the manufacturing costs for producing the apparatus are favourable and the power of the drive is adequate for removing grit from the welding electrodes, particularly in the case of hard electrodes.

As a result of its construction, the apparatus according to the invention can be installed universally and in any position. It is in particular characterized by the simple construction of the pneumatic motor, which is an integral part of the apparatus according to the invention and in particular has a torque of at least 48 Nm. The pneumatic motor rotor is housed in the machining head, along with the holder for the abrading tool.

The invention is described in greater detail hereinafter relative to embodiments shown and the attached drawings, wherein show:

Figure 1:
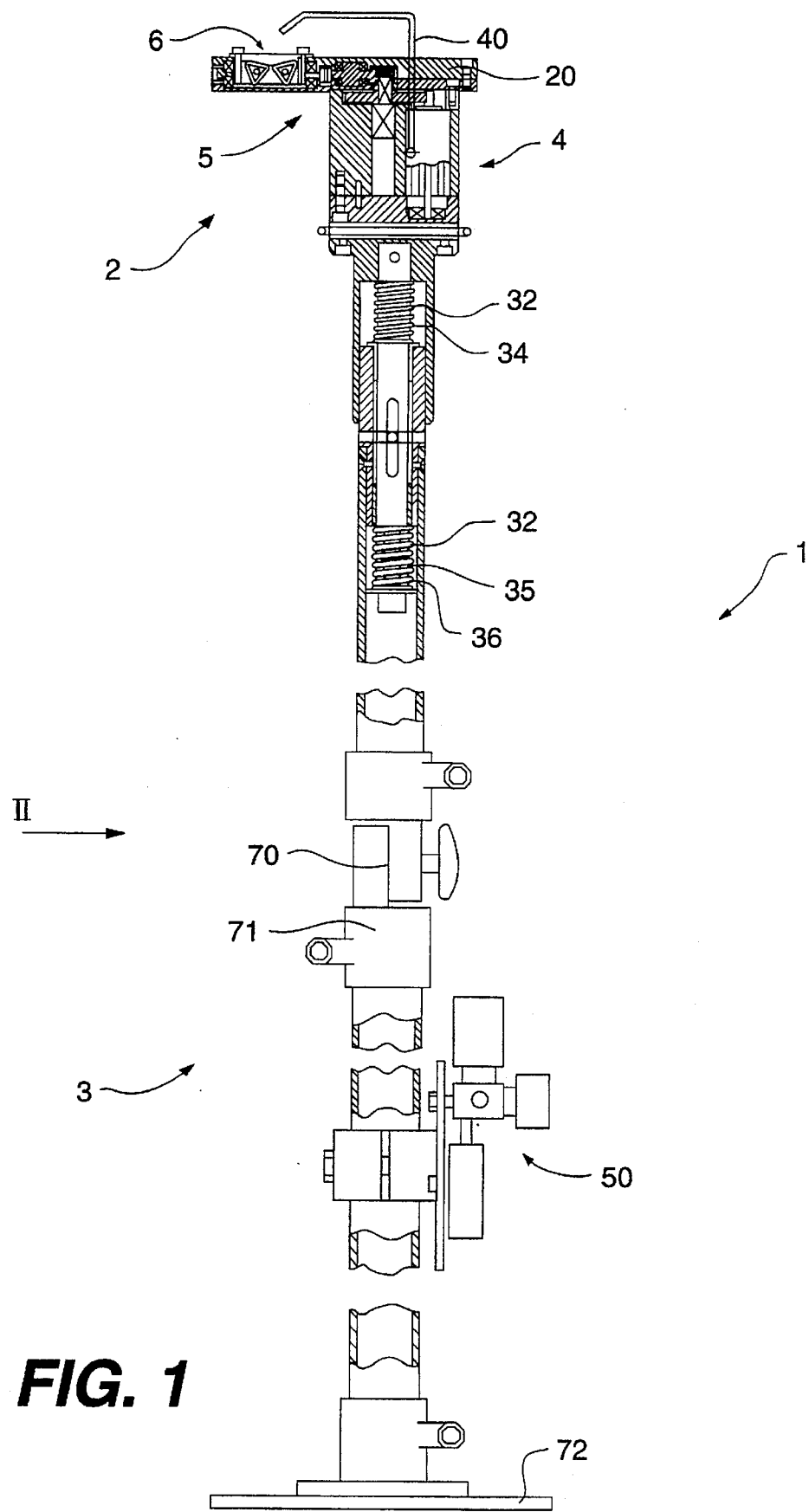
FIG. 1 is a side view of a first embodiment of the invention with a machining head located on a stand or pedestal, partly in section.
Figure 2:
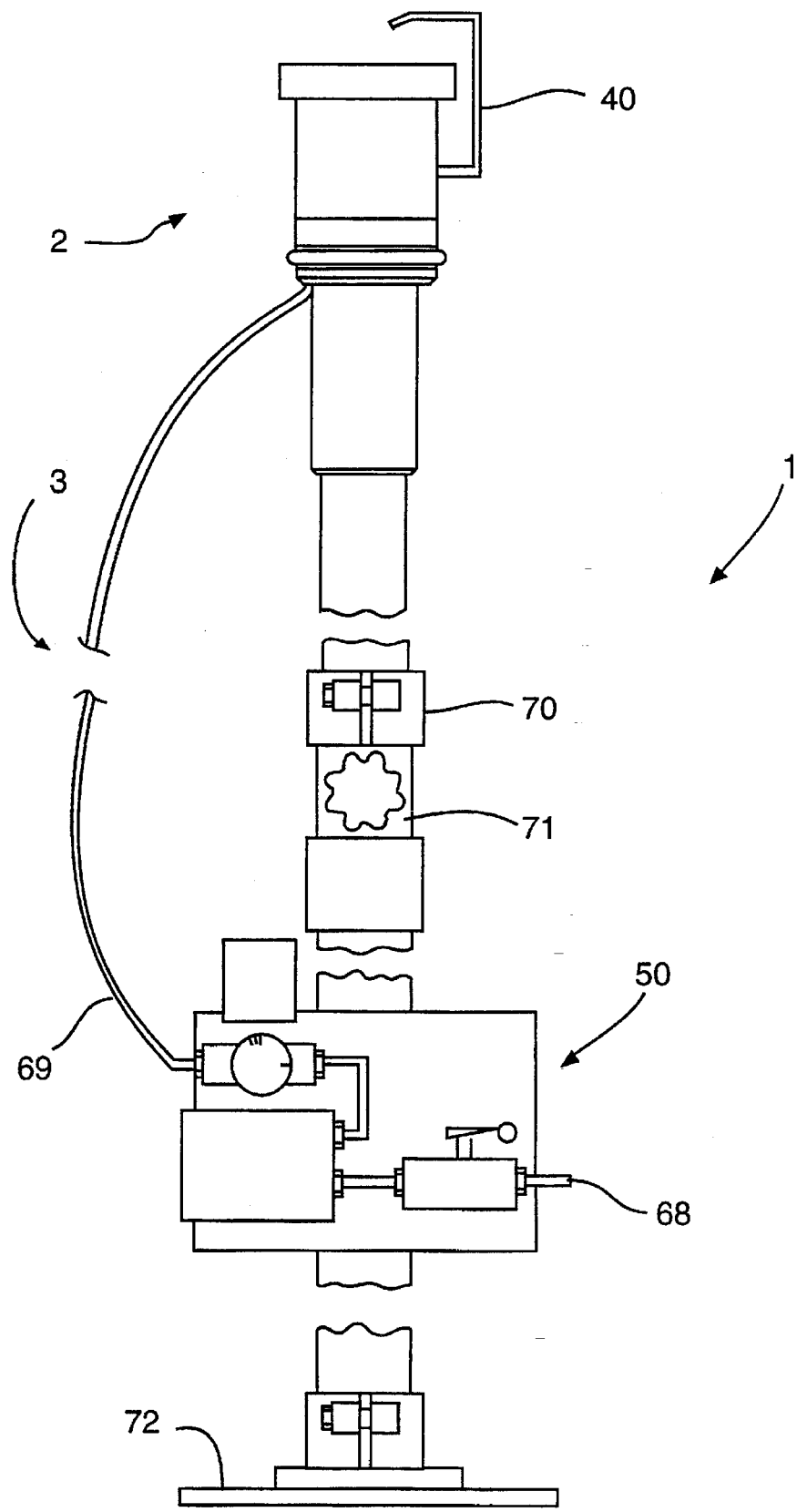
FIG. 2 is a front view of the apparatus in the direction of an arrow II in FIG. 1.
Figure 3:
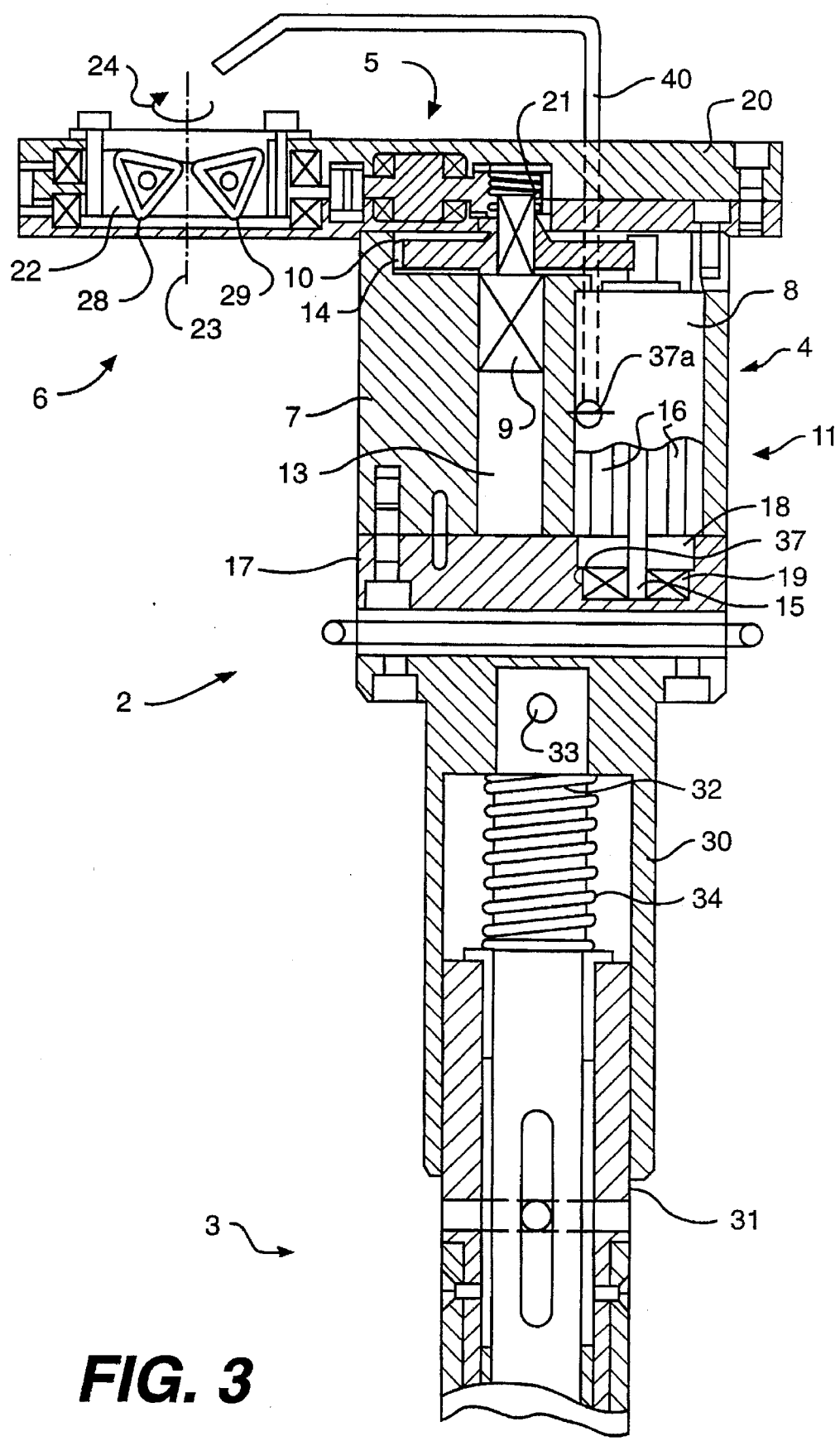
FIG. 3 is a side view of the machining head of the apparatus in section, but on a larger scale compared with FIG. 1.
Figure 4:
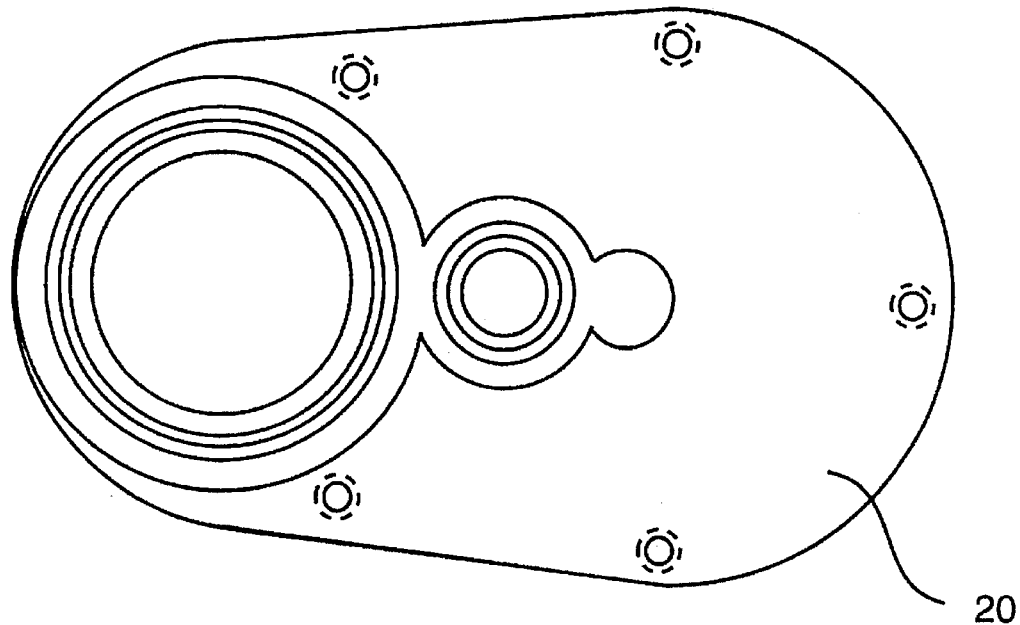
FIG. 4 is a plan view of the apparatus of FIG. 1.
Figure 5:
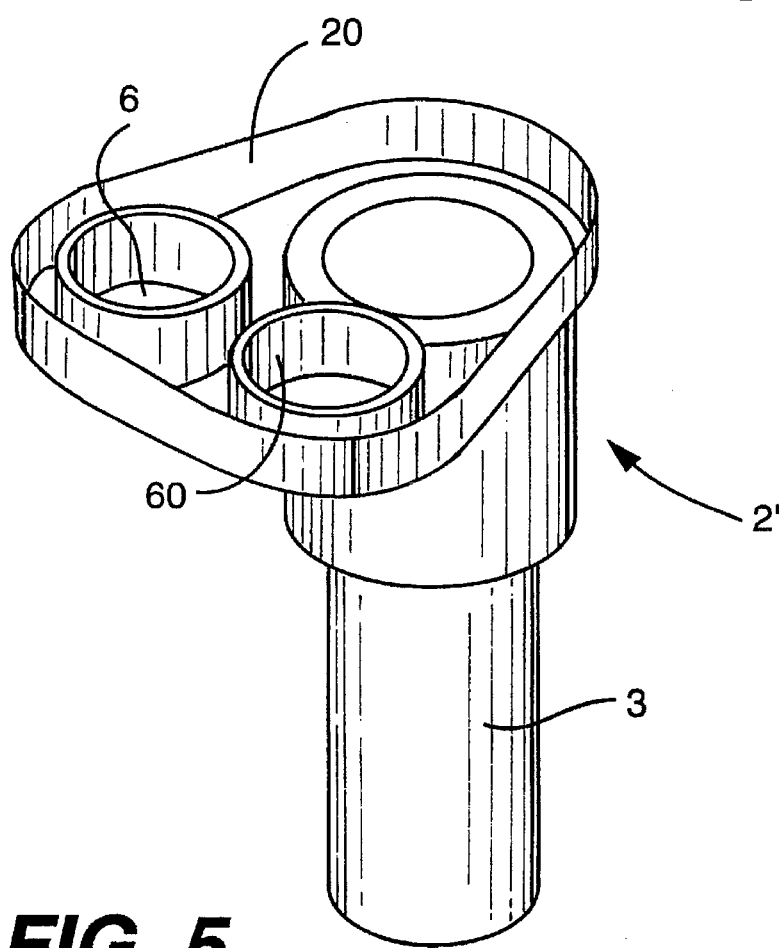
FIG. 5 is a diagrammatic, perspective view of another embodiment of the apparatus machining head.

The apparatus is essentially subdivided into two subassemblies, namely a machining head 2,2' and a holding device in the form of a stand or pedestal 3.

The machining head 2,2' comprises per se known driving elements, namely a pneumatic motor 4 and a gear 5 coupled to the latter and in the first embodiment an abrading device 6 connected to the gear 5.

In another embodiment of the machining head 2' two abrading devices 6,60 are connected to the gear 5.

The machining head 2,2' is formed from a solid body 7 having in its interior a cavity 8, a through bore 9 and a recess 10. The cavity 8 serves to receive a rotor 11 of the pneumatic motor 4, the bore 9, whose axial extension is parallel to the axial extension of the solid body 7, is used for mounting a shaft 13 and the recess 10, which is provided on the front of the solid body 7, serves to encapsulate the driving pinion 14.

The cavity 8 for receiving the rotor 11 is designed in such a way that for forming the pneumatic motor 4, it is only necessary to insert in the cavity 8 the rotor 11 with its shaft 15 and the impellers 16 fixed to said shaft 15. One end of the rotor 11 engages with the driving pinion 14, which is mounted on the shaft 13 and positioned in the recess 10.

The solid body 7 is closed by a cover 17 at its end remote from the recess 10. In the cover 17 is provided a recess 18, into which can be screwed an element 19 for mounting the rotor 11. One end of the shaft 13 for the driving pinion 14 rests in planar manner on the inside of the cover 17 facing the solid body 7.

The gear 5 necessary for driving the abrading device 6 or the two abrading devices 6,60 is mounted in a support 20. The support 20 is so fitted to the side of the solid body 7 facing the cover 17 that the shaft 13 of the driving pinion 14 engages in a pinion 21 of the gear 25.

The support 20 projects so far over and beyond the solid body 7 that in the first embodiment the abrading device 6 is freely accessible from both sides in the axial longitudinal extension of the machining head 2 or in the second embodiment the abrading devices 6,60 are freely accessible from both sides in the axial longitudinal extension of the machining head 2.

The abrading devices 6,60 in each case have a disk 22, which is rotatable about an axis 23 towards a rotation direction arrow 24 or in the opposite direction.

In the embodiments shown in the drawings the disks 22 have a simple convex shape, so that the welding electrode, which is not shown in the drawings, rests on the convex sides of the particular disk, whilst the abrading device 6 or abrading devices 6,60 rotate.

In another not shown embodiment the disk 22 has a double convex construction, so that two welding electrodes can be simultaneously machined from two sides.

At least one abrading tool 28 for machining the welding electrode is provided on the abrading device 6 or 60 on the disk 22 or the disks 22.

In another embodiment on the abrading device 6 or 60 are provided two abrading tools 28,29 for machining the welding electrode. The abrading tools 28,29 can diametrically face one another. Preferably the abrading tools 28,29 comprise replaceable throw-away cutting tool tips.

With the underside of the cover 17 the machining head 2 or 2' is fitted to a holding device in the form of a pedestal 3. The pedestal essentially comprises two telescopable tubes 30,31, which are mounted resiliently against one another by means of a rod 32. One end of the rod 32 is firmly connected to the tube 30 facing the cover 17 by means of a pin 33. The other end of the rod 32 is firmly connected to the other tube 31 by means of a plate washer 36, which is guidable in the tube 30 connected to the cover 17.

The resilient mounting of the pedestal 3 is such that a spring 34 in the tube 30 facing the cover 17 is engaged on the rod 32 and the second spring 35 on the part of the rod 32 running in the other tube 31. The springs are designed in such a way that in the inoperative state the spring 35 in the other tube 31 additionally takes up the weight of the machining head 2 or 2'.

In addition to the functional fixing of the apparatus 1, there are two alternately arranged pivot joints 70,71 at the lower end of the other tube 31, which make it possible to pivot the machining head 2 or 2' together with the resilient mounting in any random direction. A base plate 72 provided at the end of the pedestal 3 permits the fixing of the apparatus 1 be either the floor or a wall.

On the outer wall of the solid body 7 is provided on inlet bore 37 leading into the cavity 8 for the supply of air for driving the pneumatic motor 4. The air flowing into the cavity 8 of the pneumatic motor 4 drives the impellers 16 and the shaft of the rotor 11 connected to the impellers 16. The inflowing air escapes in the flow direction behind the impellets through an outlet opening 37a located on the outer wall of the solid body 7.

In another embodiment in said outlet opening is provided a valve, which constricts the outflowing air. A sound absorber is also provided, which reduces the noise occurring during the outflow of air.

In another embodiment the outlet opening 37a is used to supply compressed air to a blow-out device 40 acting on the abrading device 6 or 60.

A per se known control device 50 is also provided for controlling the drive 4 of the apparatus 1. The cavity 8 is connected by means of a flexible line 69 to the control device 50. The supply for the compressed air necessary for the operation of the apparatus 1 is provided by means of a connection 68 on the control device 50. The control device 50 also offers the possibility, on receiving a signal, e.g. from an industrial robot, to control the drive 4 of the apparatus 1.

We claim:

1. Apparatus for the mechanical removal of deposits on welding electrodes, the apparatus including a holder for an abrading tool for abrading the deposits on welding electrodes, a pneumatic drive having a rotor and a gear for driving the holder in a rotational direction, and a machining head, wherein the machining head includes the drive, the gear, at least one abrading device, and a cavity for the direct reception of the rotor of the pneumatic drive.

2. Apparatus according to claim 1, characterized in that a blow-out device is oriented with said at least one abrading device such that it can be connected to the cavity of the machining head.

3. Apparatus according to claim 1, characterized in that the machining head is mounted on a pedestal.

4. Apparatus according to claim 3, characterized in that the pedestal has two telescopable tubes mounted resiliently against one another and that the machining head is located on one of the ends in an axial extension of the tubes.

5. Apparatus according to one of the claims 1 to 4, characterized in that a control device is provided for controlling the drive.

6. Apparatus according to claim 5, characterized in that the control device is provided for receiving a signal for controlling the drive.

7. Apparatus according to one of the claims 1 to 4, characterized in that in the abrading device there is at least one abrading tool for machining the welding electrode.

8. Apparatus according to claim 7, characterized in that the at least one abrading tool is a cutting tool with at least one cutting edge.

9. Apparatus according to one of the claims 1 to 4, characterized in that in the abrading device there are two abrading tools for machining the welding electrode.

10. Apparatus according to claim 9, characterized in that the abrading tools are facing one another.

11. Apparatus according to claim 9, characterized in that the abrading tools are cutting tools with at least one cutting edge.

* * * * *